(No Model.)

A. C. PESSANO.
PULLEY.

No. 315,335. Patented Apr. 7, 1885.

WITNESSES:
A. P. Grant,
W. F. Kircher

INVENTOR:
Antonio C. Pessano
BY John A. Diederoheim
ATTORNEY.

N. PETERS, Photo-Lithographer, Washington, D. C.

United States Patent Office.

ANTONIO C. PESSANO, OF PHILADELPHIA, PENNSYLVANIA, ASSIGNOR TO GEORGE V. CRESSON, OF SAME PLACE.

PULLEY.

SPECIFICATION forming part of Letters Patent No. 315,335, dated April 7, 1885.

Application filed January 20, 1885. (No model.)

*To all whom it may concern:*

Be it known that I, ANTONIO C. PESSANO, a citizen of the United States, residing in the city and county of Philadelphia, State of Pennsylvania, have invented a new and useful Improvement in Pulleys, which improvement is fully set forth in the following specification and accompanying drawings, in which—

Figure 1:
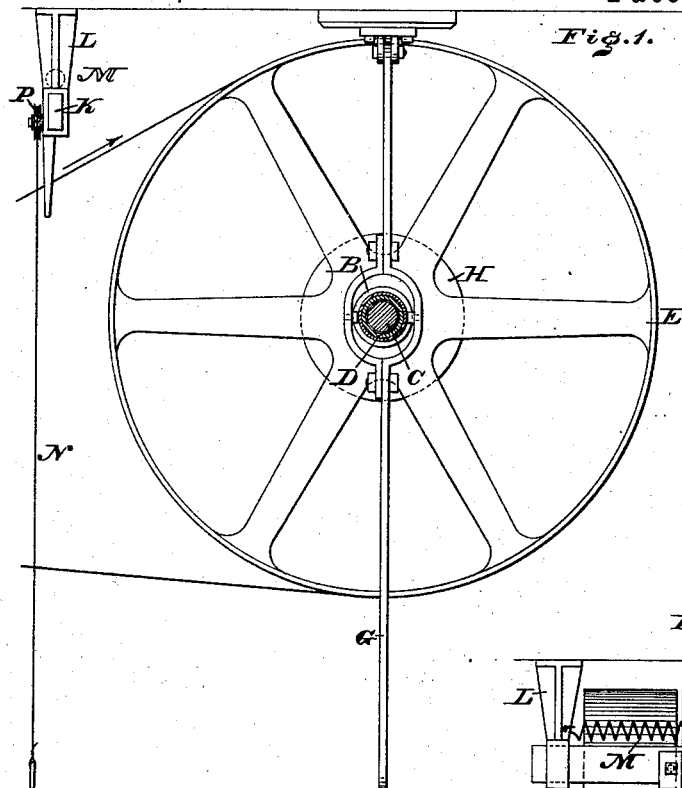
Figure 2:
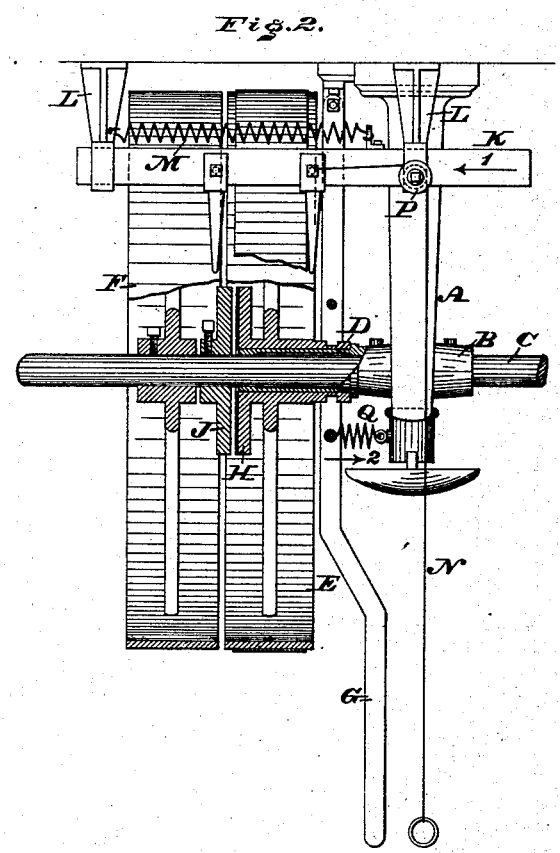

Figure 1 represents a partial side elevation and partial vertical section of a pulley embodying my invention. Fig. 2 represents a partial side elevation and partial section thereof at a right angle to Fig. 1.

Similar letters of reference indicate corresponding parts in the two figures.

My invention, consists mainly, of a shifter-bar independent of the shifting-lever, the same having connected with it a spring or its equivalent, a weighted cord or chain, so as to exert a pressure on the belt when on the loose or dead pulley, whereby when the loose pulley is moved toward the tight pulley the shifter-bar controls the belt and thus automatically shifts the same from the loose to the tight pulley. By this feature the operator or workman is relieved of the necessity of exerting force for shifting the belt from the loose to the tight pulley further than that required for moving the loose pulley to the fixed pulley, and there is a reduction of the wear and tear on the belting, pulleys, and shafting, an economy of oil, a saving of power owing to the stoppage of the belting and loose pulley when the machinery is not running, and less risk of fire in the mill or factory.

Referring to the drawings, A represents a hanger having a bearing, B, for the shaft C. The bearing B is extended laterally, forming a sleeve, D, on which is mounted a loose or dead pulley, E, said sleeve being recessed on its inner face so as to reduce the friction on shaft C, which also passes through said sleeve.

F represents the tight pulley, which is bolted or otherwise firmly secured to the shaft C, and, excepting the features of my invention, is of well-known construction.

One end of the hub of the loose pulley E is grooved to receive the fork of a shifting-lever, G, and the opposite end of said hub has formed with it a disk or flange, H, which, however, may be a separate piece and secured to the hub or arms of the pulley in any suitable manner.

To the shaft C is secured a disk or flange, J, which, as will be seen, is on the side of the fixed or tight pulley toward the flange H. Said flange J may, however, be cast or otherwise formed with the hub of the tight pulley. The side of the flange H adjacent to the flange J is faced with leather or other material suitable for creating friction between the two surfaces of the flanges when brought in contact, serving as a clutch.

K represents a shifter-bar, which is mounted in hangers L, and has connected with it a spring, M, which is also connected with one of the hangers L, and its tendency is to press one of the fingers of the bar K laterally against the belt in the direction of arrow 1. Attached to the bar K is a cord or chain, N, which, passing around a pulley, P, on one of the hangers L, is adapted for returning said bar to its normal position, and consequently replacing the belt on the loose or dead pulley.

Connected with the lever G and the hanger A is a spring, Q, the tendency whereof is to draw said lever in the direction of arrow 2, and thus move the loose pulley from the tight pulley after the belt has been placed on the latter.

The operation is as follows: The parts being in position shown in Fig. 2, the belt being idle on the loose pulley, and the tight pulley and its flange J rotating with the shaft C, the lever G is moved toward the tight pulley, whereby the loose pulley slides on the sleeve D, and the flange H is brought into engaging contact with the flange J of the tight pulley, whereby the loose pulley is rotated. As the spring M exerts its pressure on the bar K in the direction of the arrow 1, the proper finger of said bar forces the running belt toward the tight pulley, and thus the belt is automatically shifted on the latter, whereby power is communicated to the machinery to be operated and the same is accordingly set in motion, it being noticed that the actual shifting of the belt by the lever G has been avoided. The spring Q is now operative in the direction of arrow 2, and the loose pulley is thereby drawn automatically from the tight pulley, said loose pulley being inactive, the belt, however, remaining on the tight pulley, as is evident.

When it is desired to stop the machinery, the cord N is pulled or operated, and the proper finger of the shifter-bar forces the belt toward the loose pulley and it is shifted thereon, whereby it is again at rest, the tight pulley, however, being undisturbed by said action.

Having thus described my invention, what I claim as new, and desire to secure by Letters Patent, is—

1. A loose or dead pulley on a sleeve which is mounted on the shaft of the tight pulley and an automatic shifting device bearing against the belt, whereby when the loose pulley is moved toward the tight pulley the belt is automatically shifted from the loose to the tight pulley by the lateral pressure of the shifting device against said belt, substantially as and for the purpose set forth.

2. A tight pulley and a sliding dead-pulley, each having a contact disk or flange which face one another, said dead-pulley being mounted on a sleeve which is mounted on the shaft of the tight pulley, substantially as and for the purpose set forth.

3. A tight pulley and a loose pulley, in combination with a shifter-bar which is disconnected from the shifter-lever and presses against the belt on the loose pulley for automatically shifting the same from the loose to the tight pulley, substantially as and for the purpose set forth.

4. A tight pulley, a loose pulley, and a shifting-lever connected with the latter, in combination with a shifter-bar which is disconnected from said lever and presses against the belt on the loose pulley and automatically shifts said belt from the loose to the tight pulley, substantially as and for the purpose set forth.

5. A tight and a loose pulley, and a lever connected with the loose pulley, in combination with a shifter-bar provided with fingers on opposite sides of the belt, one of said fingers pressing against the belt on the loose pulley for automatically shifting the same from the loose to the tight pulley, substantially as and for the purpose set forth.

6. A tight pulley and a loose pulley, each provided with a contact disk or flange, a shaft carrying the tight pulley, a hanger having a bearing for said shaft, a sleeve continuous of said bearing forming the bearing for the loose pulley, a lever connected with the loose pulley, and a shifter-bar for the belt pressing laterally thereon, combined and operating substantially as and for the purpose set forth.

7. A tight pulley and a loose pulley with a clutch or engaging device, a shifter-bar for the belt pressing laterally thereon, a lever connected with the loose pulley, a returning cord or chain connected with the shifter-bar, and a returning-spring connected with said lever, combined and operating substantially as and for the purpose set forth.

ANTONIO C. PESSANO.

Witnesses:
JOHN A. WIEDERSHEIM,
A. P. GRANT.